United States Patent [19]

Shoji et al.

[11] Patent Number: 4,789,274

[45] Date of Patent: Dec. 6, 1988

[54] BORING APPARATUS

[75] Inventors: Michihiro Shoji; Toshio Mikiya, both of Tokyo, Japan

[73] Assignee: Nitto Kohki Co., Ltd., Japan

[21] Appl. No.: 82,353

[22] Filed: Aug. 6, 1987

[30] Foreign Application Priority Data

Nov. 28, 1986 [JP] Japan ............................... 61-281644

[51] Int. Cl.4 ............................................... B23B 47/18

[52] U.S. Cl. ......................................... 408/11; 408/14; 408/132; 408/133

[58] Field of Search ........................ 408/10, 11, 13, 14, 408/76, 132, 133, 134, 135

[56] References Cited

U.S. PATENT DOCUMENTS

| | | | |
|---|---|---|---|
| 2,882,761 | 4/1959 | Knorp et al. | 408/135 |
| 3,371,257 | 2/1968 | Warren et al. | 408/76 |
| 3,500,707 | 3/1970 | Warren | 408/76 |
| 3,975,109 | 8/1976 | Frazierr | 408/135 |

FOREIGN PATENT DOCUMENTS

| | | | |
|---|---|---|---|
| 886872 | 10/1943 | France | 408/135 |
| 60-252846 | 12/1985 | Japan . | |
| 61-41036 | 2/1986 | Japan . | |
| 61-103036 | 5/1986 | Japan . | |
| 61-157852 | 7/1986 | Japan . | |
| 184105 | 9/1966 | U.S.S.R. | 408/135 |

*Primary Examiner*—Gil Weidenfeld
*Assistant Examiner*—Daniel W. Howell
*Attorney, Agent, or Firm*—Nixon & Vanderhye P.C.

[57] ABSTRACT

A boring apparatus has a rotary member rotated by a motor, a transmission shaft transmitting its rotation to an electric drill by means of a rotation transmission mechanism for reciprocally moving the electric drill on the frame of the apparatus. The transmission shaft is selectively connected directly to the rotary member and connected operatively thereto through a coupling which is rotated reversely to the rotary member through a reduction mechanism and is designed to be disengaged from the transmission shaft when the shaft is directly connected to the rotary member and to be engaged with the shaft when the shaft is not directly connected to the roatary member. The apparatus has a selecting member which directly connects the shaft to the rotary member and disengages the coupling from the sahft. The apparatus is also provided with a switching mechanism automatically operating the selecting member to directly connect the shaft to the rotary member when the electric drill is lowered in a predetermined position.

10 Claims, 3 Drawing Sheets

BORING APPARATUS

BACKGROUND OF THE INVENTION

1. Field of the Invention

The present invention relates to a boring apparat us having an electric drill for forming a through hole in a workpiece such as a steel plate and, more particularly, to a boring apparatus wherein the electric drill supported by and moving reciprocally on a frame can be automatically moved to the return position at a high speed when the boring operation is finished.

2. Description of the Prior Art

When a through hole such as a bolt hole is to be formed in a plate-like workpiece such as a steel plate in a conventional boring apparatus, two operators must hold support rods for supporting the electric drill and push the press rods connected to the upper portion of the electric drill downward. Since two operators are required for the conventional boring operation, however, this results in an inefficient use of labor. In addition, the operators must push the press rods to form the hole, which can become very tiring, physically.

In order to solve the above problem, there has been proposed a boring apparatus which a single operator can use easily and efficiently.

With this boring apparatus, an electric drill having a tool spindle is supported on the front wall of the frame of the boring machine so as to move reciprocally in an axial direction of the spindle. In the frame, a reduction mechanism and a clutch which is engaged and disengaged according to the axial movement of a transmission shaft are provided between the drive shaft of an electric drill feed motor and the transmission shaft connected by manually rotatable arms. When the clutch is engaged by rotating the manual arms, the motor rotates the transmission shaft through the reduction mechanism to slide an electric drill supporting slide plate of the drill on the front wall of the apparatus frame in the axial directions of the tool spindle through the transmission shaft, gear and gear trains. To the bottom of the frame, an electromagnet unit is fixed to secure the frame onto the upper surface of the ferromagnetic workpiece such as a steel plate.

After the boring apparatus is placed in a predetermined position on the ferromagnetic workpiece, the electromagnet unit under the frame is magnetized to magnetically hold the frame thereon. As the electric drill is rotated and the feed motor is driven, the electric drill is moved towards the workpiece such that the rotating cutter forms a hole in the workpiece.

With the above conventional boring apparatus, the hole is automatically formed. When the cutting edges of the cutter reach the lower surface of the steel plate, however, the cutter must be manually pulled up. In doing so, the operator disengages the clutch and then turns the arms in the direction in which the transmission shaft rotates reversely to its feed direction. Thus, the electric drill is manually moved upward. Such a manual operation is time-consuming.

U.S. Pat. No. 3,371,257 discloses an electromagnetic base tool wherein the drill is fed and returned by means of electrical means. However, the switching from the feeding operation to the return operation is not made automatically but only manually, reducing the operation efficiency of the base tool.

SUMMARY OF THE INVENTION

It is an object of the present invention to provide a boring apparatus in which not only the feeding and returning operations of the cutter but also the switching from the feeding operation to the returning operation are automatically made, thereby improving boring efficiency.

In order to achieve the object of the present invention, a boring apparatus comprises a frame, an electric drill having a cutter spindle and supported by the frame so as to reciprocally move in a feed direction along the cutter spindle and a return direction opposite thereto, and a feed motor in the frame. A transmission shaft is disposed in the frame so as to be rotatable about it own axis. A rotary element is disposed between the feed motor and the transmission shaft. A clutch comprises a first toothed half rotatably mounted on the transmission shaft and a second toothed half, and the first and second toothed halves are accessible to and separated from each other so as to be engaged with and disengaged from each other. A reduction element is disposed between the rotary element and the first or second toothed half. The element reduces the rotational speed of the rotary element and transmits the reduced rotational speed in a direction opposite to the rotational direction of the rotary element to the first or second toothed half. A rotation transmission mechanism is provided in the frame and is connected to the transmission shaft so as to move the electric drill reciprocally in the axial direction of the spindle in accordance with the rotational direction of the transmission shaft. A clutch selecting mechanism is provided in the frame. When the rotary element engages the transmission shaft, the mechanism separates the second or first toothed half from the transmission shaft. When the rotary element is disengaged from the transmission shaft, the mechanism engages the second or first toothed half with the transmission shaft. An automatic switching mechanism is also provided in the frame to automatically set the selecting mechanism so as to engage the rotary element with the transmission shaft when the cutter spindle reaches at a desired position on the frame during the movement of the electric drill in the frame direction when the second or first toothed half is kept engaged with the transmission shaft.

BRIEF DESCRIPTION OF THE DRAWINGS

This invention can be fully understood from the following description with reference to the accompanying drawings, in which:

FIG. 8 is a sectional view of the main part taken along the line 3—3 of FIG. 2;

DETAILED DESCRIPTION OF THE PREFERRED EMBODIMENT

Figure 1:
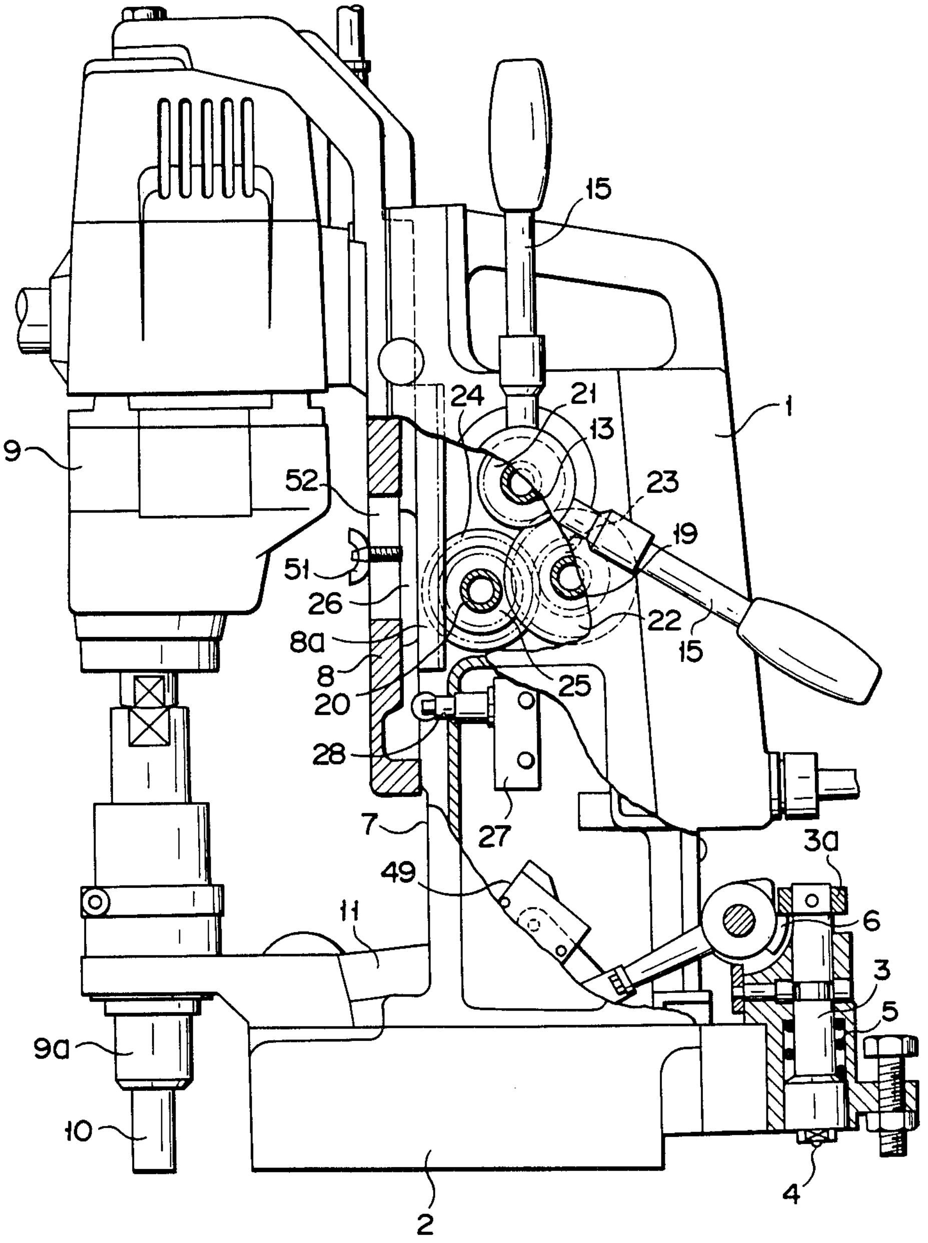
FIG. 1 is a right hand side elevational view of a boring apparatus according to an embodiment of the present invention.

FIG. 1 is a right hand side elevational view of a boring apparatus to which the present invention is applied. Frame 1 of the apparatus is located on electromagnetic base 2 provided with an electromagnet (not shown) therein. Lateral displacement preventing punch 3 is disposed behind base 2 and biased downward by compression coil spring 5. The lower end of punch 3 forms tip 4. When the apparatus is not used, punch 3 is raised by rotary stop 6 abutting on upper flange 3*a* of punch 3 and tip 4 is positioned above the lower surface of base 2, so that it does not engage a workpiece under base 2.

Slide plate 8 is mounted on front wall 7 of frame 1 and is vertically movable therealong. Electric drill 9 is supported by slide plate 8. Electric drill 9 has cutter spindle 9*a* which receives cutter 10 such as a drill or an annular cutter rotated at high speed by a drill drive motor (not shown) in drill 9. Cutting edges of cutter 10 extends downward from the lower end of electric drill 9. The lower end portion of electric drill is supported by bracket 11 forwardly extending from the lower end of frame 1 so as to be vertically moved.

Figure 5:
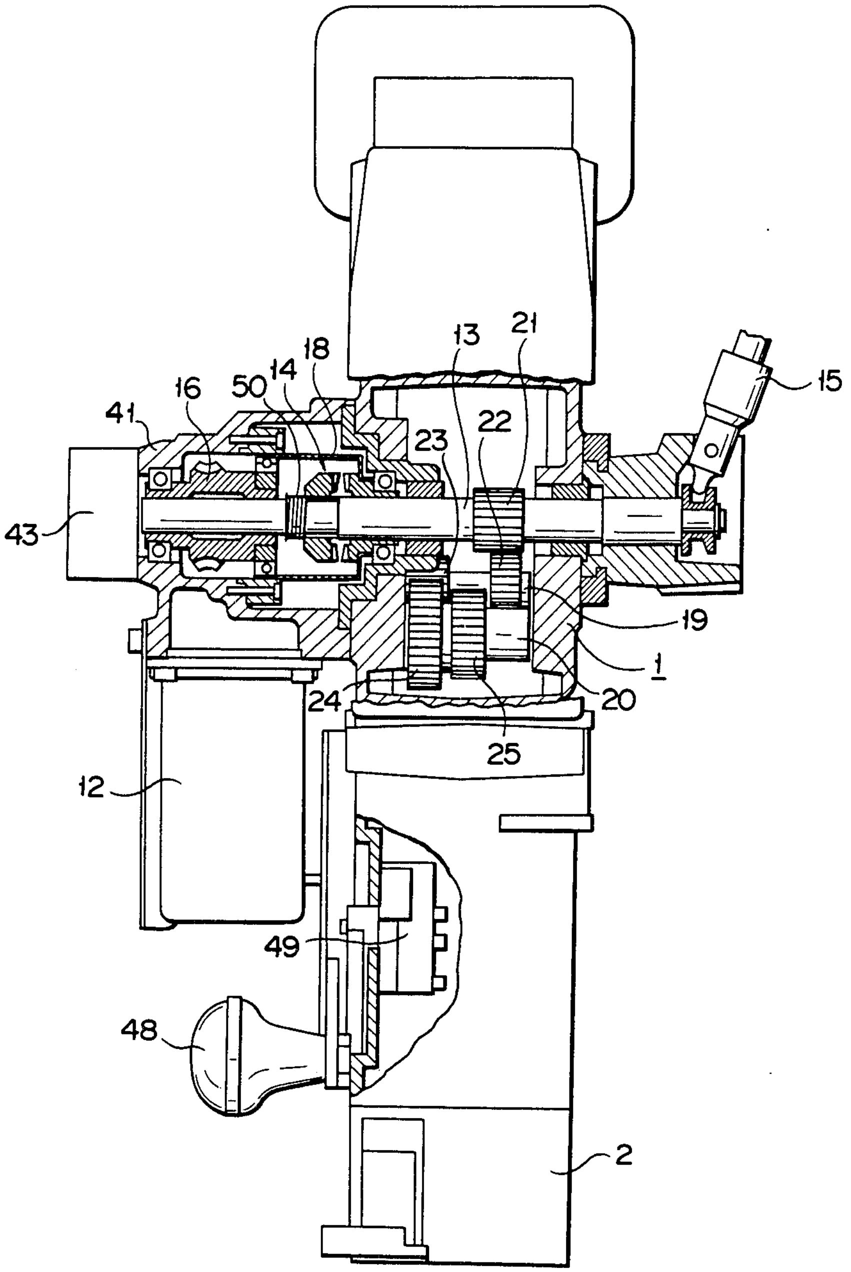
FIG. 5 is a front view of the boring apparatus of FIG. 1, showing the main part in the longitudinal section.

Referring to FIG. 5, feed motor 12 is provided in frame 1 to vertically move slide plate 8 (FIG. 1). Horizontal transmission shaft 13 is supported in casing 41 of frame 1 and moves back and forth so as to engage and disengage clutch 14. Three manually rotatable change arms 15 are connected to the external end of transmission shaft 13 to form a Y-shaped handle. The handle is used to manually move transmission shaft 13 back and forth and to rotate the same Right above feed motor 12, worm wheel 16 serving as an intermediate gear is mounted on transmission shaft 13 and is selectively engaged with and disengaged from shaft 13, as later described. Worm Wheel 16 is rotated by feed motor 12 through helical gears and a worm (both not shown).

Figure 2:
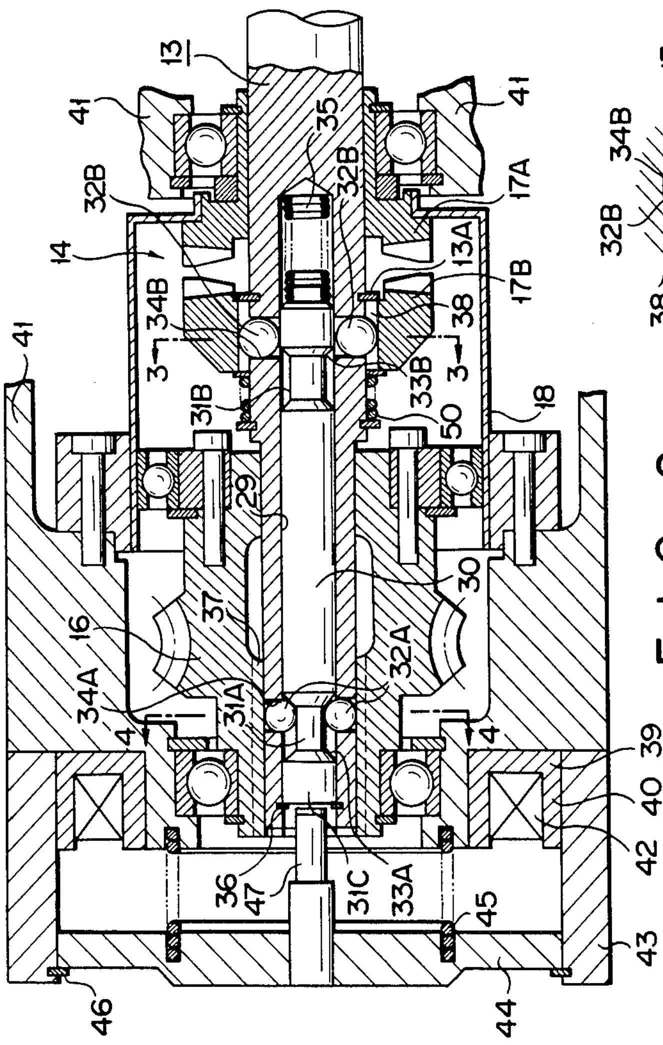
FIG. 2 is a longitudinal sectional view of the main part shown in FIG. 1.

Near worm wheel 16, clutch 14 is mounted on shaft 13, as shown in FIG. 2. Clutch 14 comprises a pair of toothed halves 17A and 17B which surround the outer surface of transmission shaft 13 and which engage with and disengage from each other. Toothed half 17A is supported on casing 41 such that half 17A can be freely rotated with respect to transmission shaft 13 but cannot be moved in the axial direction thereof. Toothed half 17B is fixed onto transmission shaft 13. Toothed half 17B is biased toward half 17A by compression coil spring 50 which surrounds transmission shaft 13. Toothed half 17B abuts against stop 13A fixed onto shaft 13. Rotation of worm wheel 16 is transmitted to toothed half 17A by means of reduction gear or reduction element 18 such as a harmonic drive, and toothed half 17A is rotated at a speed lower than that of worm wheel 16 in a direction opposite to the rotational direction thereof.

Referring to FIGS. 1 and 5, rotary shafts 19 and 20 are mounted below the central portion of transmission shaft 13 in parallel therewith. Gear 21 on shaft 13 engages gear 22 on rotating shaft 19. Gear 22 has more teeth than gear 21. Gear 23 on rotating shaft 19 engages gear 24 on rotating shaft 20 Gear 24 has more teeth than gear 28. Pinion 25 on rotating shaft 20 engages rack 8*a* (FIG. 1) fixed to slide plate 8 in parallel therewith. Therefore, reduced rotation of transmission shaft 13 by means of gears 21, 22, 23 and 24 is transmitted to pinion 25. Rack 8*a* engaging pinion 25 and fixed to slide plate 8 is moved vertically. thereby displacing electric drill 9 having rack 8*a* fixed thereto alone cutter spindle 9*a*, in the vertical direction.

As shown in FIG. 1, pointer 26 is fixed onto the inner wall of slide plate 8 by set screw 51. Screw 51 is loosened to vertically move pointer 26 on slide plate 8 along vertical elongated hole 52 until the lower end of pointer 26 abuts against actuating element 28 of limit switch 27. Limit switch 27 is provided in such a position in frame 1 that slide plate 8 is lowered until a hole is completely formed in the workpiece. The operation of switch 27 will be described later.

As shown in FIG. 2, transmission shaft 13 has cylindrical central hole extending from the end opposite to the end fixed by arms 15 to the region of clutch 14. Actuating shaft 30 is fitted in hole 29 so as to be axially movable. Shaft 30 has a diameter slightly smaller than that of hole 29 for easy axial movement of shaft 30.

Actuating shaft 30 has a pair of smaller diameter portions 31A and 31B which are axially spaced apart from each other. Frustoconical surfaces 33A and 33B are formed on both ends of smaller diameter portions 31A and 31B for guiding balls 32A and 32B to engage with and disengage from smaller diameter portions 31A and 31B. Balls 32A and 32B constitute drive transmission elements.

A pair of axial slits 34A and another pair of axial slits 34B are formed diametrically opposed to each other in the peripheral wall of transmission shaft 13. The distance between slit 34A and slit 34B is slightly longer than the distance between smaller diameter portions 31A and 31B of actuating shaft 80.

Balls 32A and 32B have a diameter larger than the thickness of transmission shaft 13 and are fitted in slits 34A and 34B.

Figure 4:
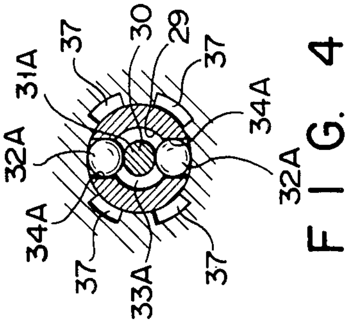
FIG. 4 is a sectional view of the main part taken along the line 4—4 of FIG. 2.

Axial grooves 37 and 38 are formed in the inner walls of Worm wheel 16 and toothed half 17B and are circumferentially equally spaced from each other. As shown in FIGS. 8 and 4, axial grooves in Worm wheel 166 are circumferentially displaced from axial grooves 38 in toothed half 17B so as not to align with each other.

Compression coil spring 35 is disposed in the deepest portion of central hole 29 and urges actuating shaft 30 leftward in FIG. 2. Annular stop 36 is provided in the opposite end of shaft 80 to the end fixed by arms 15 to limit the leftward movement of shaft 30.

When the opposite end of shaft 30 to the end fixed by arms 15 abuts against stop 36 under the biasing force of spring 35, slits 84A coincide with smaller diameter portion 31A of actuating shaft 30, and balls 32A contact the inner wall of worm wheel 16 and engage smaller diameter portion 31A. Thus, shaft 30 is disconnected from worm wheel 16. Since the distance between slits 34A and 34B is slightly larger than that between smaller diameter portions 31A and 31B as described above, balls 34A ride on actuating shaft 30 as shown in FIG. 2 and engage axial grooves 38 to toothed half 17B, whereby shaft 13 is coupled to toothed half 17B.

In the extreme rightward position of actuating shaft 30 in transmission shaft 13, balls 32A ride on actuating shaft 30 and engage axial grooves 37, whereby shaft 13 is connected to Worm wheel 16. Worm wheel 16 directly rotates shaft 13. Slits 34B align with smaller diameter portion 31B of shaft 30, and balls 32B contact the inner Wall of toothed half 17B and engage smaller diameter portion 31B. Shaft 13 is disconnected from toothed wheel 17B.

Cylindrical iron core 40 mounted on an end portion of casing 41 forming part of frame 1 so as to surround the end of transmission shaft is on the side of worm wheel 16. Coil 42 is wound around iron core 40. Iron core 40 and coil 42 constitute electromagnetic unit 39 as a traction unit. Electromagnetic unit 39 is excited when the lower end of pointer 26 urges actuating element 28 of switch 27 (FIG. 1) downward.

Guide cylinder 48 extends outwardly from casing 41 and surrounds electromagnetic unit 39. Magnetic disk or magnetic member 44 is mounted in guide cylinder 48 on the side opposite to electromagnet unit 39.

When electromagnet unit 39 is not excited, compression spring 45 disposed between iron core 40 and disk 44 urges disk 44 in a direction away from electromagnet unit 39 to cause disk 44 to abut against annular stop 46 fixed on the inner surface of guide cylinder 43, thereby ensuring a predetermined gap between electromagnet unit 39 and magnet disk 44. When electromagnet unit 39 is excited, disk 44 is attracted thereto and is moved toward unit 39 against the biasing force of compression spring 45.

Press rod 47 is fixed to the central portion of the inner wall of disk 44. Rod 47 is moved to the right upon excitation of electromagnet unit 89 to move actuating shaft 30 to the right (FIG. 2). As described above, balls 32B engage smaller diameter portion 31B of shaft 30 in the region of toothed half 17B of clutch 14 such that shaft 13 is disengaged from toothed half 17B. Ball 32A are fitted in axial grooves 37 of worm wheel 16 to connect shaft 13 to worm wheel 16.

When clutch 14 is engaged while electromagnet unit 39 is deenergized, transmission shaft 13 is rotated by worm wheel 16 at a cutting feed speed through reduction gear 18, clutch 14 and balls 34B. When electromagnet unit 39 is excited, however, transmission shaft 13 is rotated directly by worm Wheel 16 at the return speed higher than the cutting speed and reverse thereto. Electromagnet unit 39 is energized when pointer 26 abuts against actuating element 28 of limit switch 27. A solenoid unit may be used in place of electromagnet unit 89.

The operation will now be described below.

Figure 3:
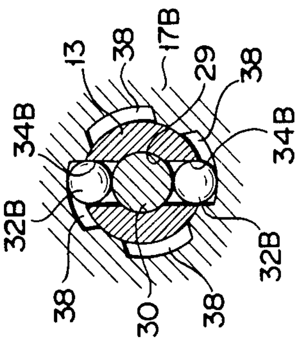

In order to ensure safe operation before operation of the boring apparatus, arms 15 are pushed to retract transmission shaft 13 (in the left direction in FIGS. 2 and 5). Toothed halves 17A and 17B of clutch 14 are disengaged from each other, and switch 48 is set at the "off" position. The boring apparatus is set in the state shown in FIGS. 2 to 4. Then, the boring apparatus is placed on a ferromagnetic plate-like or block-like workpiece to be bored in its required position.

Switch 48 is set at the first "on" position to close the circuit of electromagnetic base 2. Magnetized base 2 attracts the workpiece and the boring apparatus is fixedly set of the upper surface of the workpiece.

When switch 48 is set at the second "on" position, the following operations are simultaneously performed.

First, base 2 is continued to be magnetized.

Second, switch 49 is on to clockwise rotate stop 6 by such a predetermined angle (FIG. 1) as stop 6 is disengaged from upper flange 3*a* of lateral displacement preventing punch 3. As a result, punch 3 is rapidly moved downward under the biasing force of compression coil spring 5, and its tip 4 is pressed in the upper surface of the workpiece. Thus, boring apparatus is electromagnetically and mechanically fixed onto the workpiece. During the boring operation, the boring apparatus is not displaced from the set position on the workpiece.

Third, both a drill drive motor (well known per se and not shown) in electric drill 9 and feed motor 12 are driven.

The automatic boring operation will be described below. Arms 15 are pulled toward the operator while the drill drive motor and feed motor 12 are driven. Then, transmission shaft 13 is moved to the right (FIGS. 2 and Toothed halves 17A, 17B engage each other. Rotation of worm wheel 16 is transmitted to transmission shaft 13 through reduction gear 18, toothed halves 17A and 17B, and balls 32B. Transmission shaft 13 is rotated in the feed direction at a speed lower than that of worm wheel 16.

Referring to FIGS. 1 and 5, the rotational speed of transmission shaft 13 is reduced through gears 21, 22, 23, and 24, and the reduced rotation is transmitted to pinion 25. Rack 8*a* meshed with pinion 25 is moved downward by counterclockwise rotation of pinion 25 in FIG. 1. As a result, electric drill 9 is moved downward together with slide plates to which rack 8*a* is fixed and cutter 10 is lowered to form a hole in the workpiece.

When boring is finished, the lower end of pointer 26 urges actuating element 28 of limit switch 27, and the circuit of electromagnetic unit 39 is closed to excite magnetic unit 39. Disk 44 is attracted by electromagnetic unit 44 in the right direction in FIGS. 2 and 5, and actuating shaft 80 is moved by press rod 47 to the right. Balls 32B are engaged with smaller diameter portions 31B of actuating shaft 80 and are disengaged from axial grooves 38 of toothed half 17B. Therefore, toothed half 17B is free from actuating shaft 30. As a result, transmission shaft 13 is disengaged from reduction gear 8 and is not rotated by worm wheel 16 through clutch 14. Balls 32A are moved from smaller diameter portions 31A on actuating shaft 30 through frustoconical portions 33A. Balls 32A are thus engaged with axial grooves 37 of Worm wheel 16. Thus, worm 16 is directly coupled with transmission shaft 13. Shaft 30 is rotated in the opposite direction to that of the worm wheel 16 at the return speed higher than the feed speed in the reverse direction thereto.

Reverse rotation of transmission shaft 13 is transmitted to pinion 25 through the same gearing mechanism as in the feed rotation, and pinion 25 rotates clockwise in FIG. 1. Electric drill 9 is rapidly raised together with rack 8*a*, and cutter 10 is separated from the workpiece. When electric drill 9 reaches at a predetermined height, the upper end of pointer 26 abuts against another limit switch (not shown) to stop the drill drive motor and feed motor 12 and to deenergize electromagnetic unit 89. Thus, actuating shaft 80 is returned to the starting position (FIG. 2). In this manner, return operation is completed. Arms 48 are returned to the "off" position so as to ensure safety for the next operation.

The boring apparatus is manually operated as follows:

After switch 48 is set to the second "on" position and arms 16 are pulled to disengage clutch 14, arms 15 are manually rotated in the feed direction. Transmission shaft 13 is rotated together with arms 15. Electric drill 9 is moved downward in the same manner as in automatic feeding, and cutter 10 forms a hole in the workpiece. If clutch 14 is disengaged after pointer 26 urges actuating element 28 of limit microswitch 27, the circuit of electromagnet unit 39 remains open to prevent switching of actuating shaft 30. In this case, the state in FIG . 2 is maintained. Therefore, by manually rotating arms 15 in a direction opposite to the feed direction the boring apparatus is moved upward and cutter 10 is separated from the workpiece.

What is claimed is:

1. A boring apparatus comprising:

a frame;

an electric drill having a cutter spindle and supported by said frame so as to be capable of reciprocal movements in a feed direction along said cutter spindle and a return direction opposite to the feed direction;

a feed motor provided in said frame;

a transmission shaft provided in said frame and having an axis around which said transmission shaft rotates;

rotating means provided between said feed motor and said transmission shaft so as to be rotatably driven by said feed motor;

a clutch comprising a first toothed half rotatably mounted on said transmission shaft and a second toothed half, said first and second toothed halves being engageable with and disengageable from each other;

reduction means provided between said rotating means and one of said first and second toothed halves for reducing a speed of said rotating means and transmitting rotation having a direction opposite to that of said rotating means to said one of said first and second toothed halves;

rotation transmitting means mounted in said frame and driven by said transmission shaft for reciprocating said electric drill along said cutter spindle in accordance with the rotational direction of said transmission shaft;

engaging means operable to (i) connect said rotating means to said transmission shaft and disengage the other one of said first and second toothed halves therefrom and (ii) connect said other one of said first and second toothed halves to said transmission shaft and disengage said rotating means therefrom;

selecting means for alternately moving said engaging means so as to (a) disengage said other one of said first and second toothed halves from said transmission shaft and to engage said rotating means with said transmission shaft, and (b) engage said transmission shaft with said other one of said first and second toothed halves and to disengage said rotating means from said transmission shaft; and automatic switching means for automatically setting said selecting means so as to engage said rotating means with said transmission shaft when said selecting means reaches a desired position on said frame while said electric drill moves in the feed direction when said other one of said first and second toothed halves is kept engaged with said transmission shaft.

2. The apparatus according to claim 1, wherein said rotating means comprises a worm wheel coaxial with said transmission shaft and rotatable thereabout; and said engaging means comprises first engaging means for engaging said worm wheel with and disengaging the same from said transmission shaft, and second engaging means for engaging said other one of said first and second toothed halves with and disengaging the same from said transmission shaft.

3. The apparatus according to claim 2, wherein said transmission shaft has a hollow cylindrical peripheral wall having a thickness;

said selecting means comprises a rod-like actuating shaft slidably inserted into said transmission shaft and having on said axis of said transmission shaft a first position and a second position between which said actuating shaft is movable, said actuating shaft having an outer periphery;

said first engaging means comprises first smaller diameter portion formed in said outer periphery of said actuating shaft in a region of said worm wheel, first axial slits formed in said peripheral wall of said transmission shaft such that said first axial slits are in alignment with said smaller diameter portion in the first position of said actuating shaft and are out of alignment therewith in the second position of said actuating shaft, first axial grooves formed in said worm wheel so as to be opposed to said first axial slits, and first balls fitted in said first axial slits and having a diameter larger than said thickness of said peripheral wall of said transmission shaft;

said second engaging means comprises second smaller diameter portion formed in said outer periphery of said actuating shaft in a region of said first toothed half, second axial slits formed in said peripheral wall of said transmission shaft such that said first axial slits are out of alignment with said second smaller diameter portion in the first position of said actuating shaft and are in alignment therewith in the second position of said actuating shaft, second axial grooves formed in said first toothed half so as to be opposed to said second axial slits, and second balls fitted in said second axial slits and having a diameter larger than said thickness of said peripheral wall of said transmission shaft;

said selecting means comprises moving means for normally setting said actuating shaft in the first position and moving said actuating shaft to the second position in response to said switching means; and said second toothed half is coupled to said worm wheel through said reduction gear.

4. The apparatus according to claim 3, wherein said first second smaller diameter portions have frustoconical surfaces at both ends thereof.

5. The apparatus according to claim 3, wherein said moving means comprises an electromagnet unit and a magnetic member which is attracted by said electromagnet unit to move said actuating shaft from the first position to the second position.

6. The apparatus according to claim 5, wherein said moving means comprises a press rod coaxial with said actuating shaft and extending from said magnetic member toward said actuating shaft, and a spring normally biasing said magnetic member towards the first position.

7. The apparatus according to claim 5, wherein said switching means comprises a pointer mounted on said electric drill, and a limit switch operated by said pointer in a position on said frame to excite said electromagnet unit.

8. The apparatus according to claim 7, wherein said frame is provided with adjusting means for allowing adjustment of said pointer along said spindle.

9. The apparatus according to claim 1, wherein said transmission shaft is axially movable and has arms mounted on one end of said transmission shaft for engaging said first toothed half with said second toothed half when said arms are pushed and disengaging said first toothed half from said second toothed half when said arms are pulled.

10. The apparatus according to claim 9, wherein said arms are fixed to said transmission shaft for rotating said transmission shaft when said arms are manually rotated.

* * * * *